United States Patent
Aurongzeb et al.

(10) Patent No.: US 10,223,959 B2
(45) Date of Patent: Mar. 5, 2019

(54) INFORMATION HANDLING SYSTEM INTEGRATED OVERLAPPED FOLDABLE DISPLAY

(71) Applicant: Dell Products L.P., Round Rock, TX (US)

(72) Inventors: Deeder M. Aurongzeb, Austin, TX (US); Stefan Peana, Austin, TX (US); David M. Meyers, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 15/658,941

(22) Filed: Jul. 25, 2017

(65) Prior Publication Data

US 2019/0035324 A1  Jan. 31, 2019

(51) Int. Cl.
| | | |
|---|---|---|
| G09G 3/20 | (2006.01) | |
| G09G 5/14 | (2006.01) | |
| G09G 5/37 | (2006.01) | |
| G09G 5/36 | (2006.01) | |
| G06F 1/16 | (2006.01) | |
| G09G 5/377 | (2006.01) | |
| G09G 3/3208 | (2016.01) | |
| G06F 3/041 | (2006.01) | |

(52) U.S. Cl.
CPC ......... *G09G 3/2096* (2013.01); *G06F 1/1616* (2013.01); *G06F 1/1643* (2013.01); *G06F 1/1647* (2013.01); *G06F 1/1652* (2013.01); *G06F 1/1681* (2013.01); *G06F 3/0416* (2013.01); *G09G 3/3208* (2013.01); *G09G 5/14* (2013.01); *G09G 5/377* (2013.01); *G09G 5/363* (2013.01); *G09G 2320/0626* (2013.01); *G09G 2320/0666* (2013.01); *G09G 2360/141* (2013.01); *G09G 2360/145* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,873,662 | A * | 10/1989 | Sargent | G06F 3/02 711/200 |
| 9,507,388 | B1 * | 11/2016 | Hampton | G06F 1/1618 |
| 9,557,771 | B2 * | 1/2017 | Park | G06F 1/1641 |
| 9,964,995 | B1 * | 5/2018 | Morrison | G06F 1/1652 |
| 2012/0264489 | A1 | 10/2012 | Choi | H04M 1/0216 455/566 |
| 2014/0226275 | A1 * | 8/2014 | Ko | G06F 1/1626 361/679.27 |
| 2016/0132076 | A1 * | 5/2016 | Bitz | G06F 1/1681 361/679.27 |
| 2017/0038641 | A1 * | 2/2017 | Yamazaki | G02F 1/133555 |
| 2017/0069241 | A1 * | 3/2017 | Musgrave | G09G 3/2003 |
| 2017/0263179 | A1 * | 9/2017 | Aurongzeb | G09G 3/3225 |

* cited by examiner

*Primary Examiner* — Wesner Sajous
(74) *Attorney, Agent, or Firm* — zag; Robert W. Holland (57) ABSTRACT

A portable information handling system having rotationally coupled housing portions disposes first and second OLED display films in an overlapped configuration having the display films slide relative to each other as the housing portions rotate. Presentation of visual images at one or both of the OLED display films in the overlapped portion is adjusted to blend with the images presented at non-overlapping portions of the OLED display films.

20 Claims, 6 Drawing Sheets

INFORMATION HANDLING SYSTEM INTEGRATED OVERLAPPED FOLDABLE DISPLAY

BACKGROUND OF THE INVENTION

Field of the Invention

The present invention relates in general to the field of portable information handling systems, and more particularly to an information handling system integrated overlapped foldable display.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems generally integrate processing components, input/output (I/O) devices and a power source in a portable housing that allows use of the system free from cabled interfaces, such as peripheral displays, peripheral I/O devices and external power adapters. Tablet portable information handling systems have a planar housing that typically integrates processing components and a battery underneath a display that covers one side of the planar housing. Generally end users interact with a tablet information handling system through a touchscreen display that presents user interfaces, such as a virtual keyboard, and associates touch positions with the user interface position. Often, the touchscreen display is the only integrated input device included in a tablet information handling system. The planar display surface is typically covered with a hardened glass that provides touch detection through a capacitive touch surface. In contrast to tablet form factors, convertible portable information handling systems generally have multiple housing portions that rotationally couple with each other. A typical convertible system includes a main housing portion that integrates processing components and I/O devices, such as keyboard and touchpad, and a lid housing portion that integrates a display. Hinges that rotationally couple the main and lid housing portions to each other typically allow rotation from a closed position having the display proximate a keyboard to an open "clamshell" position having the display in a viewing position substantially 90 degrees to the keyboard. In some cases, the hinges rotate the housing portion 360 degrees to expose the display in a convertible tablet form factor with the keyboard providing a resting support. Various types of convertible housing configurations are available to manage conversion of rotationally-coupled housing portions between closed, clamshell and tablet form factors.

A shift from liquid crystal display (LCD) technology to organic light emitting diode (OLED) display technology has provided an opportunity to adapt more flexible information handling system housing form factors. Specifically, OLED displays present images with a flexible film that generates light to create images. Thus, in contrast to LCDs, OLED displays do not need a backlight and accompanying structural support. Further, OLED display films have a flexible nature that allows bending and folding. Foldable form factors provide an attractive design concept as the unfolded system presents a large display area while a folded system offers a smaller display area for portable usage scenarios, such as with a mobile phone. However, OLED display films generally do have to have some outer protective covering to prevent damage to the OLED material. Further, folded OLED display films tend to experience compressive and expansive stresses during folding resulting in waving across the fold area impacting the visual performance of the fold area relative to the rest of the OLED display film. Integrating OLED display films that have a large surface area into a portable housing that folds can increase manufacturing complexity and cost due to the equipment involved in the manufacturing and the structural mechanisms that maintain a consistent OLED display film fold.

SUMMARY OF THE INVENTION

Therefore, a need has arisen for a system and method which provides integrated and partially-overlapped foldable display films.

In accordance with the present invention, a system and method are provided which substantially reduce the disadvantages and problems associated with previous methods and systems for folding display films. First and second rotationally coupled housing portions have a first display film over the first housing portion and a second display film over the second housing portion with an overlap of the first and second display films near the housing rotational axis. As rotation of the housing portions folds the display films at the rotational axis, the display films slide relative to each other at the overlap to change the size of the overlapping portion and provide a folded viewing area along the rotational axis.

More specifically, a portable information handling system has a housing with base and lid portions that rotate between closed and tablet configurations. The information handling system processes information with processing components disposed in the base portion, such as a CPU, RAM and a GPU, to generate visual information for presentation as visual images to an end user at a display assembly disposed over both the base and lid portions. For example, the GPU generates pixel values communicated to first and second OLED display films that illuminate the visual image by driving pixels with the pixel values. The first display film is disposed over the base portion and the second display film is disposed over the lid portion with the first and second display films overlapping at a portion proximate a hinge that rotationally couples the base and lid portions. The first and second display films slide relative to each other at the overlapping portion as the base and lid housing portions rotate relative to each other. Pixel values presented at the overlapping portion are adjusted to blend the visual images presented by the first and second display films based upon the size and location of the overlapping portion. For example, touch of the first and second display films is detected and applied to identify pixel values to adjust for blending of the visual images. In one example embodiment, a solid lubricant, such as graphene, is disposed between the overlapping portions to reduce friction at the display films as they slide. In various embodiments, various sensors detect the overlapping portion and provide compensation for blending of the first and second display film visual images, such as ambient light sensors, cameras, touch sensors and processing resources that adapt pixel values to achieve a blended presentation at the overlapping portion.

The present invention provides a number of important technical advantages, One example of an important technical advantage is that an information handling system housing rotates to fold an integrated display without introducing deformations at the display that impact visual performance of the display. Overlapping separate display films sliding relative to each other proximate a rotational axis, such as at a hinge, reduce the amount of fold that the display film is subjected to relative to contiguous display film disposed over the rotational axis. An underlying display film that suffers from folding-related distortions are hidden below an overlying display film that benefits from a supported surface to maintain an undistorted viewing field. The portion of the first and second display films that overlap is identified by touches of the overlapping portion so that pixel values in the overlapping portions are blended with adjustments that hides the overlap from viewing by an end user. For example, brightness, color, and or contrast of one or both display films is adjusted to blend images at the overlapping portion with non-overlapping display portions. A tablet configuration having rotationally-coupled housing portions folds about a rotational axis with the separate display films overlapping at the rotational axis provides substantially less stress at the display film during folding compared with folding of a contiguous display film.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system housing portions rotate to fold a display about a rotational axis, the display having first and second films that overlap at the rotational axis and slide relative to each other as the housing portions rotate. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
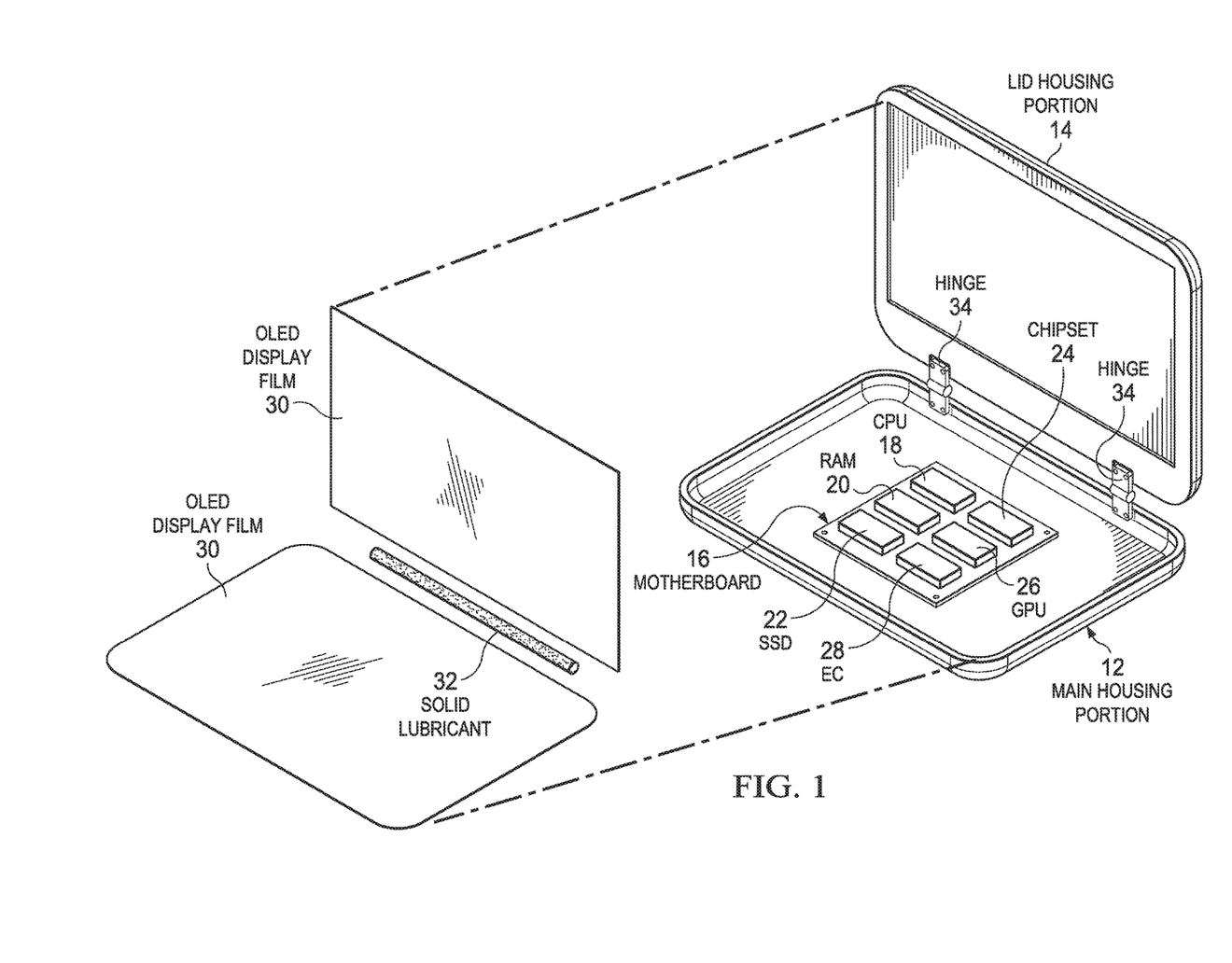
FIG. 1 depicts a side perspective blown-up view of an information handling system having first and second OLED display films disposed over rotationally-coupled housing portions.

Referring now to FIG. 1, a side perspective blown-up view depicts an information handling system 10 having first and second OLED display films 30 disposed over rotationally-coupled housing portions 12 and 14. Information handling system 10 processes information with processing components disposed in a main housing portion 12. In the example embodiment, a motherboard 16 supports communications between a central processing unit (CPU) 18 that executes instructions to process information and a random access memory (RAM) 20 that stores the instructions and information. Persistent storage, such as a solid state drive (SSD) 22 stores information when the system is powered down, such as to support boot of an operating system to CPU 18 and RAM 20. A chipset 24 includes a variety of processing components that cooperate to interface hardware and software components, such as managing user interfaces for inputting and outputting information, managing power supply to the processing components and executing embedded code to coordinate system activities. In the example embodiment, a graphics processing unit (GPU) 26 generates pixel information for presenting visual information at display films 30 and an embedded controller 28 manages inputs detected as touches at a touchscreen integrated in display film 30. In alternative embodiments, various hardware and software configurations may be included to process information as known in the art of information handling systems.

OLED display films 30 present visual images based upon pixel values driven from GPU 26. One display film 30 is disposed over lid housing portion 14 and the other is disposed over main housing portion 12. Display films 30 overlap at a central location of information handling system 10, such as at the rotational axis defined by hinges 34 that rotationally couple base housing portion 12 to lid housing portion 14. A solid lubricant 32, such as a layer of graphene, is disposed between display films 30 to reduce friction at the overlapping portion of display films 30. Advantageously, graphene provides a thin layer of low friction material that also transfers heat along a defined path so that heat transfer is supported from display films 30 to a heat sink in housing portions 12 and 14 through the graphene. In alternative embodiments, alternative lubricants or friction-reducing steps may be used.

As housing portions 12 and 14 rotate relative to each other, display films 30 at the overlapping portion slide relative to each other and fold to provide freedom of rotation without deforming the visual image presented by the combined display of the separate display films 30. Sliding of separate display films 30 relative to each other reduces compressive and expansion forces applied to each display film 30 that can lead to deformation and waving across a fold area. Defining one display viewing area with separate display films 30 allows folds at an overlapping portion of display films 30 that adapts as rotation takes place about a fixed radius. The separate display films 30 reduce stress at the folding region, provide an increased working display area and offer a seamless display stacking with visual compensation at the overlapping area that blends visual images from both display films 30. For example, display pixel compensation corrects visual image presentation at the overlapping portion changes in size due to rotation of housing portions 12 and 14. Sensor driven compensation provided by software, firmware and/or hardware components addresses optical losses in color, brightness and contrast to blend visual images as the overlapping area changes in size.

Figure 2:
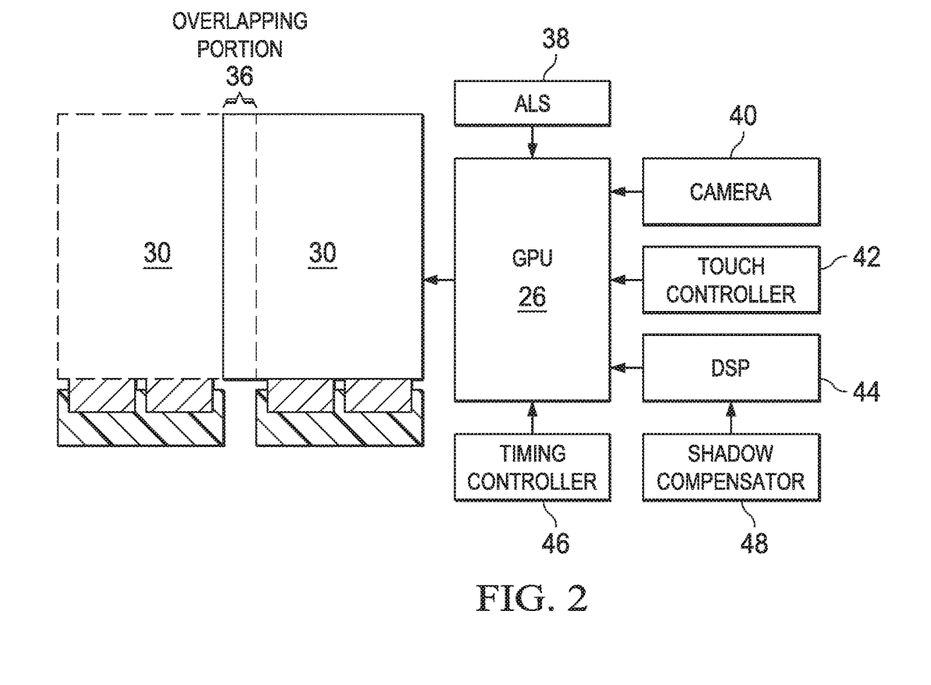
FIG. 2 depicts a block diagram of an information handling system configured to adjust image presentation at overlapping display films.

Referring now to FIG. 2, a block diagram depicts an information handling system 10 configured to adjust image presentation at overlapping display films 30. In the example embodiment, display films 30 have a tablet configuration with an overlapping portion 36. As described below, the size of overlapping portion 36 changes as display films 30 rotate from the tablet configuration to a folded configuration, such as a clamshell or closed configuration. GPU 26 drives pixel values for display films 30 to generate visual images, such as with information provided by an application executing on a CPU. Timing controller 46 or other similar controller scans the pixel values to display films 30 to adapt the visual image as visual information changes over time. An ambient light sensor (ALS) 38 detects ambient light so that GPU 26 adjusts the visual image to adapt to ambient conditions. A touch controller 42 detects touches at a touchscreen of display films 30, such as a capacitive touch screen integrated with a cover over display films 30. Touches provide inputs to the information handling system by the end user. The example embodiment includes a single GPU, ALS and touch controller that coordinate interactions at both display films 30, however the disclosure is not limited to the example embodiment and alternative embodiments may use multiple supporting devices in alternative configurations as known in the art.

Blending of visual images at overlapping portion 36 may be supported in a variety of manners. As an example, touch controller 42 detects the touch of display films 30 against each other to identify the size and location of overlapping portion 36. Touch detection may be supplemented with an identifiable touch pattern provided by the display film touch, such as the lengthwise touching and the type of capacitive signal. GPU 26 applies correction to the brightness, color and/or contrast of pixel values at display films 30 based upon the relative position of the pixels, such as with predefined correction values stored in GPU 26. Correction to pixel values may include corrections at the overlap area 36 as well as correction to pixel values proximate to overlap area 36, with correction values determined based upon anticipated visual image presentation for a base set of conditions. Once base correction is established for a detected overlap 36, addition corrective actions may be applied using sensed conditions. For example, ambient light sensed by GPU 26 may applied by sensing the actual brightness generated by overlapped and non-overlapped display portions and comparing the sensed brightness to correct pixels at and proximate to overlap portion 36. In some example embodiments, multiple ALS 38 may be disposed at and proximate to the overlapping and non-overlapping portions of the display to have direct and exact measurements of brightness for generating correction. For instance, one or more ALS 38 may be integrated with solid lubricant 32 to measure brightness at plural locations of the overlap portion 36, thus allowing granular control of brightness by GPU 26, Another example corrective action is provided by camera 40, which takes an image of the display proximate the overlap portion 36 to allow a comparison of brightness, color and contrast between overlap portion 36 and adjacent non-overlapping portions of display films 30. In addition, camera 40 provides viewing angle information related to an end user viewing the display that helps drive blending of the overlapping portion to meet the conditions of the end user viewing the display.

In one example embodiment, corrective actions for blending visual images at overlapping portion 36 are managed by a dedicated hardware component, such as a digital signal processor (DSP) 44. For example, DSP 44 executes a shadow compensator 48 as embedded code to rapidly provide GPU 26 with corrected pixel values. Shadow compensator 48 accepts ALS, camera, touch controller and other sensed information to generate pixel corrections. A correction algorithm executing within shadow compensator 46 is programmable to adapt shadow compensation response as desired by an end user and as corrective measures and improved blending are identified. Dedicated DSP or other hardware allow GPU 26 to offload the pixel compensation for correcting overlapping portion 36, however, some or all corrective measures may remain with GPU 26, or may even be done at an application level by CPU 18. For instance, angular detection of the housing rotation provides an initial base correction at an application level or embedded controller level so that the size of overlap portion 36 is estimated using housing portion rotational orientation. Establishing a base correction on an application level provides more rapid and granular correction values by GPU 26 since the initial presentation of visual images more proximately estimates a desired blended view.

Figure 3:
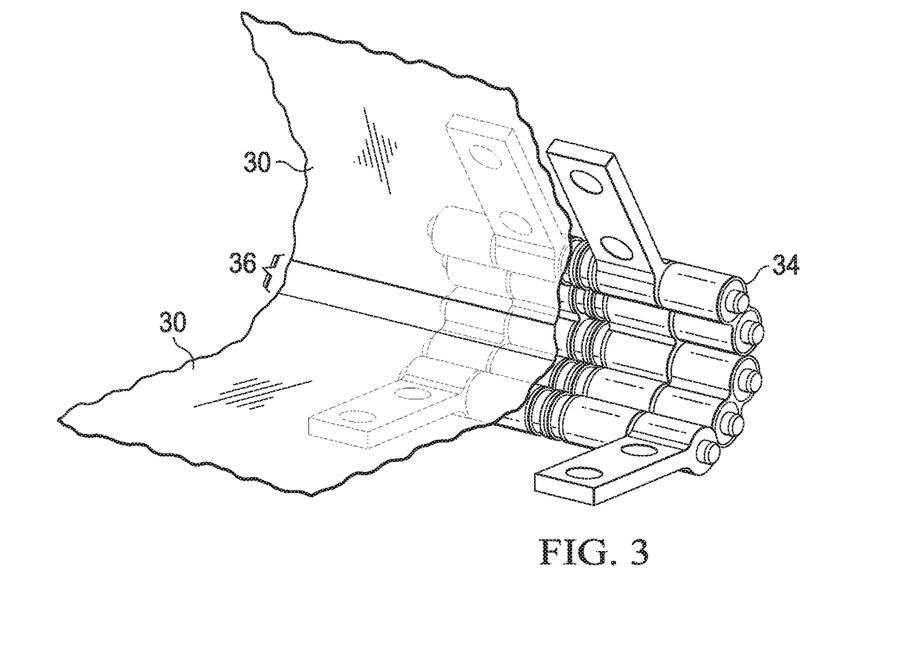
FIG. 3 depicts a side perspective view of a hinge having overlapping display films sliding relative to each other at a rotational axis.

Referring now to FIG. 3, a side perspective view depicts a hinge having overlapping display films 30 sliding relative to each other at a rotational axis. In the example embodiment, hinge 34 has rotated to a partially-open position so that display films 30 have folded at the rotational axis defined by hinge 34. As the circumference defined by the hinge rotation changes with hinge rotational orientation, overlap portion 36 changes in size. For example, increased rotation to a closed position results in the greatest amount of overlap. In contrast, rotation past a tablet configuration so that display films 30 are on the outer surface of housing portions 12 and 14 will result in the least amount of overlap. Thus, the amount of overlap 36 will vary based upon the amount of rotation allowed by hinges 34. In various embodiments, hinges are selected to control the amount of display film overlap and the amount of fold that the display films allow. For example, hinge 34 may have three to six (or more)

pivot elements that interlock and translate rotation between each other. The example embodiment has five equal-sized interlocking pivot elements. Changing the curves and curvatures of hinge 34, such as by changing, such as by changing the size and interlocking relationship, provides variable torque and a foldable device having multi-pivot variable curvature so that the display fold is more precisely managed about the curvature defined by the hinge rotation. Display film fold constraints may be managed by selecting a hinge that provides a curvature within the fold constraints of the display film. Thus, maintaining less than a maximum fold constraint at the first and second display films is managed by controlling display film folding with a predefined fold circumference established by the hinge.

Figure 4:
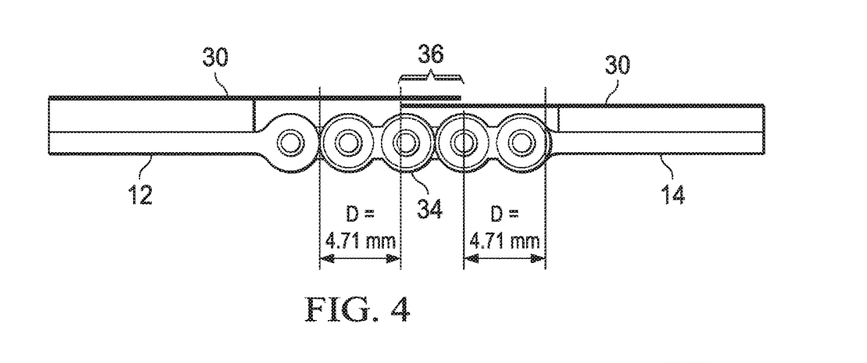
FIG. 4 depicts a side view of the hinge rotated to a tablet configuration having overlapping display films at a rotational axis.
Figure 5:
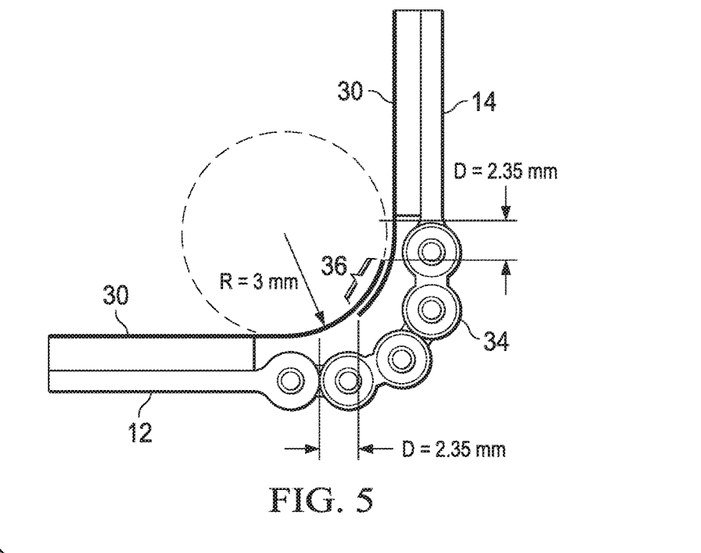
FIG. 5 depicts a side view of the hinge rotated to a clamshell configuration.
Figure 6:
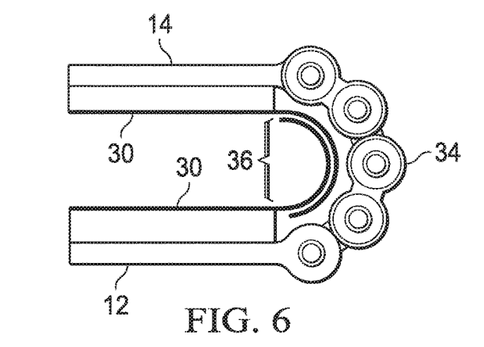
FIG. 6 depicts a side view of the hinge rotated to a closed configuration.

Referring now to FIG. 4, a side view depicts the hinge 34 rotated to a tablet configuration having overlapping 36 display films 30 at a rotational axis. The example embodiment includes example dimensions for hinge 34 size and rotational axis circumference as hinge 34 rotates. In the depicted tablet configuration, an end user has a planar view of display films 30 where corrective pixel values blend overlapping portion 36 with adjacent non-overlapping portions of display films 30. Referring now to FIG. 5, a side view depicts the hinge 34 rotated to a clamshell configuration. As housing portions 12 and 14 rotate relative to each other, display films 30 fold about a circumference that decreases in size with increased housing rotation. The reduced circumference's impact on display films 30 is managed by sliding display films 30 relative to each other. In the example embodiment, display films 30 are each anchored in place relative to the housing portion over which each display film is disposed so that sliding is isolated to movement of display films relative to each other at hinge 34. In an alternative embodiment, some movement of the display film relative to its housing portion may be used to also manage display fold, such as by sliding display films 30 away from hinge 34 as hinge 34 rotates to a closed position. In another alternative embodiment, the underlying display film 30 may have less fold and remain directed towards hinge 34. Further, management of fold angles for both display films 30 may include disposition to a solid lubricant between displays films 30 at the overlapping portion 36. Referring now to FIG. 6, a side view depicts the hinge 34 rotated to a closed configuration. As hinge 34 closes, display films 30 reach their maximum fold angle. The maximum fold angle may be managed by adapting the hinge circumference and the amount of overlapping display film 30 so that a predetermined fold limit is not exceeded. For example, if a maximum fold angle results in deformation of display film 30, coordination of hinge 34 circumference, display film 30 position relative to the housing and fold angle may keep the fold angle below the maximum.

Figure 7:
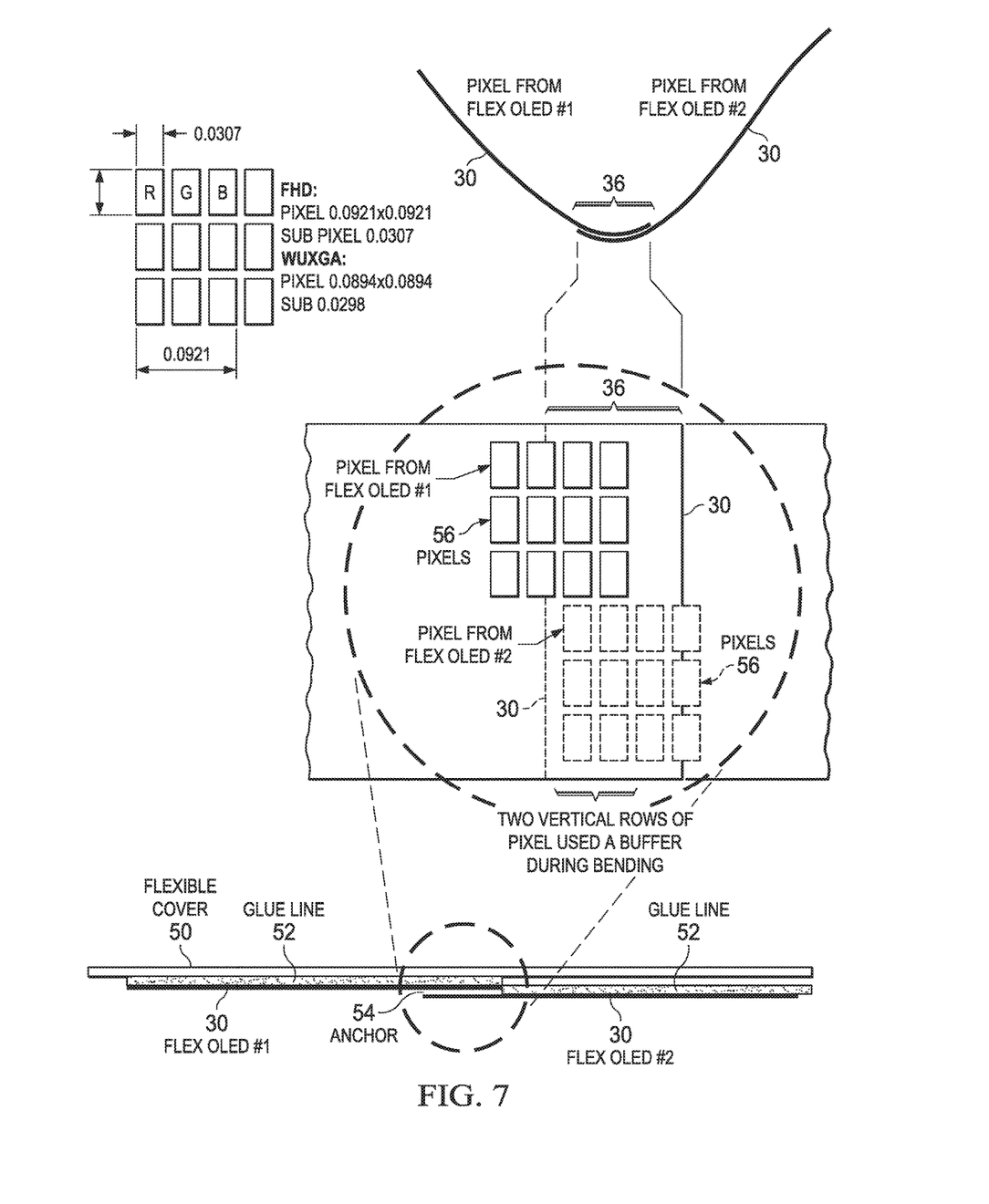
FIG. 7 depicts overlapping pixels of an example embodiment having overlapped display films.

Referring now to FIG. 7, overlapping pixels 56 are depicted at an example embodiment having overlapped display films 30. In the example embodiment, a flexible OLED display film 30 #1 is anchored at a first glue line to a first housing portion and a second flexible OLEO display film #2 is anchored at a second glue line 52 to a second housing portion. A flexible cover 50 protects the assembled separate display films 30, such as a protective layer of plastic, Teflon, COP or PET disposed across the housing portions. In the example embodiment, display film 30 #1 rests over top of display film 30 #2 relative to a user so that rotation of the housing portions results in exposure of display film 30 #2. In the example blown-up view, two vertical rows of pixels are used as a buffer during bending that results from housing portion rotation. In overlapping portion 36, a consistent visual image is maintained through movement of the display films 30 by detecting the buffer region, such as based upon touch detection, and bleeding in visual images presented at display film #1 onto pixels of display film #2 as the pixels of display film #2 are exposed. Similarly as rotation hides a greater portion of display film #2, the buffer region bleeds away visual images on display film #2 so that the visual image stays consistent at the overlapping regions. For example, if the image viewing area on display film #2 grows smaller, the image is shifted so that the visual image stays consistent at the intersection of the display films 30 and steps off the opposing end of the display film. That is, the shorter display caused by rotation to a closed position loses pixel values at one or both opposing ends while the visual image at the overlapping portion remains consistent. In alternative embodiments, changing display size may be managed in other manners, like changing resolution.

As depicted by FIG. 7, some number of pixels in the underlying display film 30 #2 will remain underneath display film 30 #2 and potentially impact the presentation of visual images in the overlap portion 36. As an example, OLED display films tend to be transparent so that light illuminating from the upper display film #1 may have a different visual effect due to reflections passing through display film #2 and other background impacts. To minimize such effects and provide improved blending, display film #2 pixels may illuminate to with color, brightness and contrast that mixes with the illumination from display film #1 to provide a uniform appearance between the overlapping and non-overlapping portions. In one embodiment, both the display films alter their pixel values in an overlapping portion to match the appearance.

Figure 8:
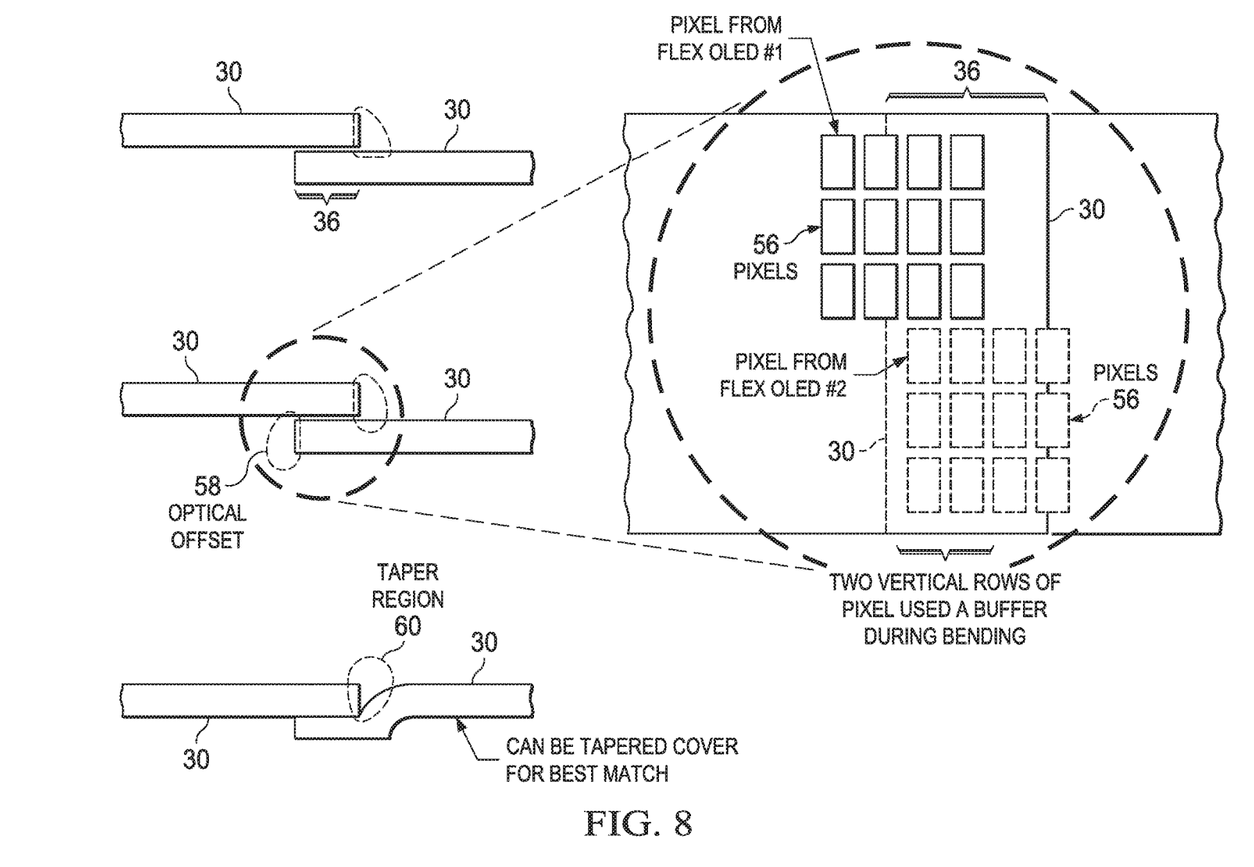
FIG. 8 depicts overlapping pixels of an alternative example embodiment having overlapped display films.

Referring now to FIG. 8, overlapping pixels 56 are depicted at an alternative example embodiment having overlapped display films 30. Adjustments to pixel values provide blending over visual appearance at the overlapping portion 36 as discussed above. In the example embodiment, various optical offsets 58 are applied to aid in achieving a blended appearance at the intersection of the display film overlap. In one embodiment, pixels offset at the end of a display film to present light at an off angle relative to other pixels. In another embodiment, a tapered intersection is provided by pressing an upper display film downwards into an underlying display film. Adjustments applied to adjacent pixels at the overlap intersection may vary based upon the type of intersection and orientation of pixels at the end of the display film.

Figure 9:
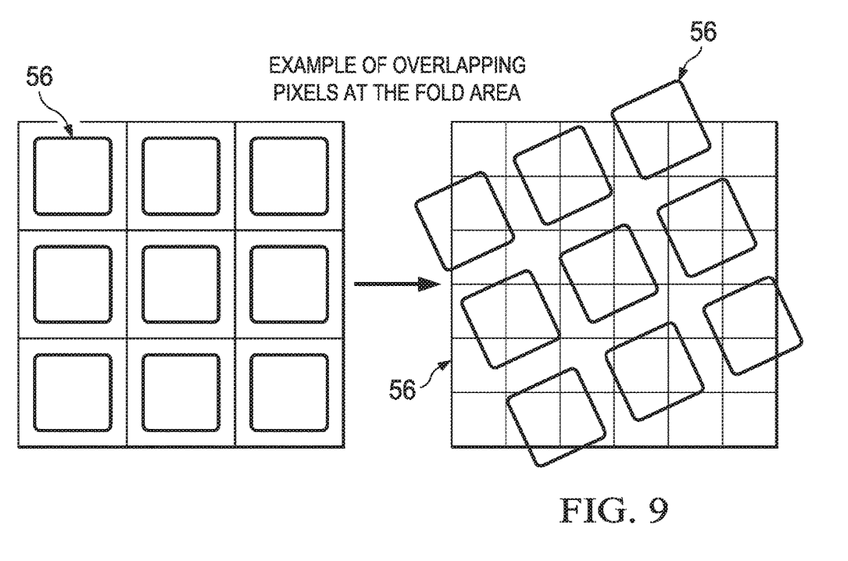
FIG. 9 depicts an example embodiment having overlapping pixels with varied orientations.
Figure 10:
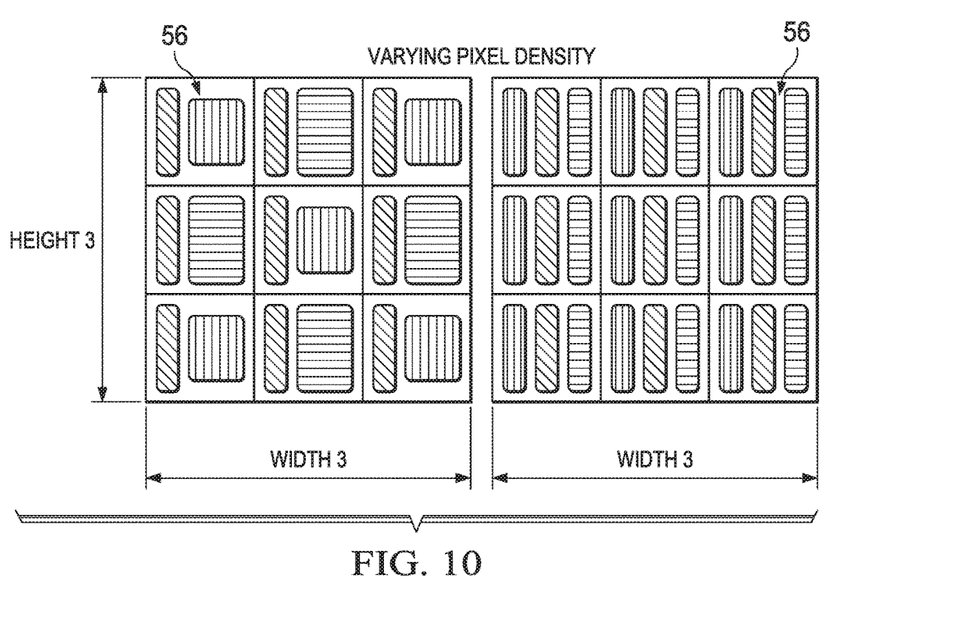
FIG. 10 depicts an example embodiment having overlapping pixels with varied sizes.

Referring now to FIGS. 9 and 10, example embodiments depict overlapping pixels 56 with varied orientations. FIG. 9 depicts pixels 56 with offset alignment in an overlapping portion. FIG. 10 depicts pixels 56 with varied pixel density in the overlapping portion. In various embodiments, changing pixel 56 size, density and orientation provides various effects on blending of visual images at the overlapping portion. The variations in pixel size, density and orientation may be restricted at the overlap portion relative to other portions of the display film, or may adapt by gradually implementing different pixel orientations based upon proximity to the overlapping portion.

Although the present invention has been described in detail, it should be understood that various changes, substitutions and alterations can be made hereto without departing from the spirit and scope of the invention as defined by the appended claims.

What is claimed is:

1. A portable information handling system comprising:
   first and second housing portions;
   one or more hinges rotationally coupling the first and second housing portions to rotate between at least a closed and a planar configuration;
   a processor integrated in at least one of the first and second housing portions and executing instructions to process information;
   a graphics processor integrated in at least one of the first and second housing portions and interfaced with the processor, the graphics processor converting information into visual information for presentation by a display; and
   first and second display films interfaced with the graphics processor to present the visual information as visual images, the first display film disposed over the first housing portion, the second display film disposed over the second housing portion, a portion of the first and second display films overlapping at the one or more hinges, the overlapping portions slide relative to each other as the first and second housing portions rotate between the closed and planar configurations.

2. The portable information handling system of claim 1 further comprising:
   a touchscreen associated with at least one of the first and second display films; and
   a controller interfaced with the touchscreen to determine the relative sliding position of the first and second display films, the controller adapting visual images presented on at least one of the first and second display films based upon the relative sliding position.

3. The portable information handling system of claim 2 wherein the controller determines the relative sliding position of the first and second display films by detecting a boundary between touching of the first and second display films.

4. The portable information handling system of claim 3 further comprising a shadow compensator interfaced with the graphics processor, the shadow compensator adjusting presentation of visual images of at least one of the first or second display films based at least in part upon the detected boundary to blend visual images of the first and second displays in the overlapping portion.

5. The portable information handling system of claim 1 further comprising a graphene film disposed between the first and second display films, the graphene film reducing friction during sliding of the first and second display films relative to each other.

6. The portable information handling system of claim 5 further comprising a heat sink thermally coupled to the graphene film.

7. The portable information handling system of claim 1 where the first display film comprises a first pixel density at a first portion that does not overlap with the second display film and a second pixel density at a second portion that does overlap with the second display film.

8. The portable information handling system of claim 1 further comprising:
   a digital signal processor interfaced with the graphics processor and configured to adjust pixel values applied to at least one of the first or second display films; and
   one or more light sensors disposed to detect light emitted by the first and second display films;
   wherein the digital signal processor adapts pixel values to match brightness emitted at the overlapping display portions with the non-overlapping display portions.

9. The portable information handling system of claim 8 further comprising a viewing angle sensor interfaced with the digital signal processor and operable to detect a viewing angle of an end user viewing the first and second display films, the digital signal processor further configured to adjust pixel values based upon the viewing angle to match the brightness of the overlapping display portions with the non-overlapping display portions.

10. A method for presenting visual information at a portable information handling system, the method comprising:
    presenting a first visual image at a first display film disposed over a first portion of a rotationally coupled housing;
    presenting a second visual image at a second display film disposed over a second portion of the rotationally coupled housing, the first and second display films having an overlapping portion;
    rotating the rotationally coupled housing, the rotating causing the first and second display films to slide relative to each other; and
    adjusting the visual image at at least one of the first or second display films as sliding of the first and second display films changes a size of the overlapping portion.

11. The method of claim 10 further comprising:
    detecting the overlapping portion with a touchscreen integrated with at least one of the first and second display films; and
    adjusting the visual image based upon the overlapping portion detected by the touchscreen.

12. The method of claim 10 further comprising:
    aligning pixels at the first and second display films with a first orientation; and
    aligning at least some of the pixels in the overlapping portion with a second orientation different from the first orientation.

13. The method of claim 10 further comprising disposing a solid lubricant between the first and second display films to reduce friction as the first and second display films slide relative to each other.

14. The method of claim 10 further comprising maintaining less than a maximum fold constraint at the first and second display films by managing display film folding with predefined fold circumference established by the hinge.

15. The method of claim 10 further comprising:
    observing the overlapping portion with one or more sensors; and
    in response to the observing, adjusting the visual image presented by at least one of the first and second display films at the overlapping portion to blend the separate images presented by the first and second display films.

16. The method of claim 15 further comprising:
    observing a brightness at the overlapping portion;
    providing the brightness to a digital signal processor interfaced with at least one of the first and second display films; and
    in response to the brightness, adjusting the illumination of the at least one of the first and second display films with the digital signal processor.

17. The method of claim 15 further comprising:
    observing a color at the overlapping portion;
    providing the color to a digital signal processor interfaced with at least one of the first and second display films; and
    in response to the brightness, adjusting the color of the at least one of the first and second display films with the digital signal processor.

18. The method of claim 10 further comprising connecting the overlapping portion at the hinge, the size of the overlapping portion changing in response to the rotating.

19. A display comprising:
a first OLED display film presenting information as visual images;
a second OLED display film presenting information as visual images, at least a portion of the second OLED display film overlapping the first OLED display film at an overlapping portion;
a graphics processor having non-transitory memory storing instructions, the instructions executing on the graphics processor to generate pixel information that defines illumination at pixels of the first and second OLED display films; and
a shadow compensator stored in the non-transitory memory, the shadow compensator executing on the graphics processor to adjust the illumination by one or more of the first and second OLED display films to blend visual images presented at the overlapping portion with visual images presented at the first and second OLED display films that do not overlap.

20. The display of claim 19 wherein the first and second OLED display films slide relative to each other to change the size of the overlapping portion, the shadow compensator adjusting illumination based at least in part upon a determination of the size of the overlapping portion.

* * * * *